United States Patent

Rope et al.

[15] 3,683,486
[45] Aug. 15, 1972

[54] METHOD OF FABRICATING A CASTING MOLD

[72] Inventors: Barry S. Rope; James E. Huffaker, both of Kingsport, Tenn.

[73] Assignee: Eastman Kodak Company, Rochester, N.Y.

[22] Filed: June 1, 1970

[21] Appl. No.: 42,107

[52] U.S. Cl. ............... 29/428, 264/219, 264/220, 264/225, 29/469
[51] Int. Cl. ............................................. B23p 19/00
[58] Field of Search.......264/227, 226, 225, 224, 223, 264/222, 221, 220, 219; 29/428, 445, 469, DIG. 10

[56] References Cited

UNITED STATES PATENTS

| | | | |
|---|---|---|---|
| 1,599,534 | 9/1926 | Kerley | 264/227 |
| 2,248,811 | 7/1941 | Cotterman | 264/227 |
| 3,098,262 | 7/1963 | Wisotzky | 264/227 |
| 3,189,670 | 6/1965 | Robison | 264/227 |
| 3,235,438 | 2/1966 | Wisotzky | 264/227 |
| 3,379,812 | 4/1968 | Yakovou | 264/227 |
| 3,473,989 | 10/1969 | Richmond | 264/227 |
| 3,520,967 | 7/1970 | Kreier | 264/227 |
| 3,548,050 | 12/1970 | Mozer | 264/227 |
| 3,562,049 | 2/1971 | Maher | 264/227 |

*Primary Examiner*—John F. Campbell
*Assistant Examiner*—D. P. Rooney
*Attorney*—Cecil D. Quillen, Jr. and John F. Stevens

[57] ABSTRACT

A method of fabricating a casting mold having an intricate pattern from a simple master precision mold is disclosed. A small master male mold is first fabricated. The master male mold is used for making a master female or intermediate mold of a flexible material. From the intermediate mold, a number of small male sections of a flexible material which may be the same as the intermediate mold may be pieced together to form a larger mold from which a product may be fabricated.

4 Claims, 8 Drawing Figures

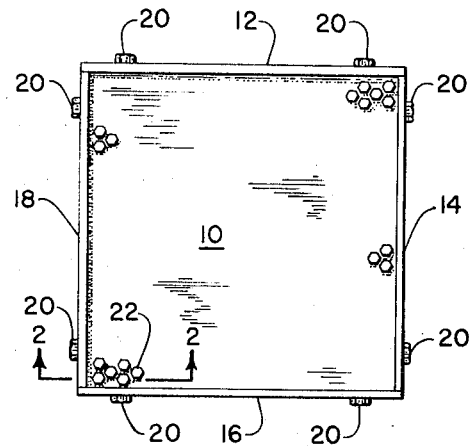
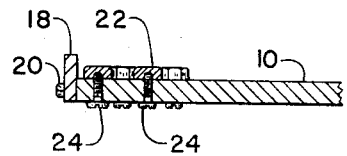
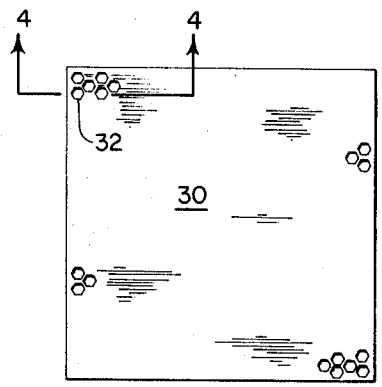

BARRY S. ROPE
JAMES E. HUFFAKER
INVENTORS

ATTORNEYS

METHOD OF FABRICATING A CASTING MOLD

This invention relates generally to molds for casting materials. More particularly, this invention relates to a process for fabricating a large casting mold of an intricate pattern from a simple master mold, and thereafter fabricating a continuous product therefrom.

The present invention is useful in the manufacture of continuously molded sheet material, such as for example, a continuous sheet of thermoplastic material molded into a three-dimensional sheet provided with a multiplicity of closely spaced cellular protrusions formed therein having side walls extending substantially perpendicular to the plane of the sheet.

In the past, much difficulty has been encountered in such molds due to such requirements as durability, flexibility, economy, and the like. For producing a continuous product on an endless belt-type mold, the most must have the flexibility and durability to bend many times in passing around rolls over which it is entrained. In such bending, it is imperative that fractures of the mold do not occur, because a defect in the molded material will occur at the point of fracture. Furthermore, a major problem occurs in attempting to fabricate a continuous mold, because if it is attempted in a continuous casting operation, the mold itself would necessarily have to be flexible.

In the molding of patterns of intricate features, problems have also been encountered in the incorporation of the delicate features into the mold. When the pattern is repetitious of a multiplicity of intricate details, the problem also is multiplied. Intricate details should not be too difficult or costly to incorporate into the mold. Furthermore, the possibility of damage to the mold details must be considered, and if such occurs, replacement of individual sections must be economical and relatively simple.

The mold must have the ability to withstand relatively high molding temperatures as well as numerous and rapid temperature fluctuations without undue dimensional changes or fracturing. Moreover, the intricate details of the pattern must be precision-made and fitted so there is no possibility of flashing which might make the molded article difficult to strip from the mold, as well as a defective article.

The present invention provides a small master male mold for casting master female or intermediate molds. From this intermediate mold, production molds of intricate repeating patterns are fabricated which can be pieced together to make a large, continuous pattern with substantially no interruption in the pattern. Much flexibility therefore results from being able to change designs at will without having to make a large, expensive mold.

According to the present invention, a small master male mold is fabricated in a precision manner from a strong, rigid material such as metal. This master male mold is used for making a master female or intermediate mold of a less permanent type, preferably of a flexible material of the same kind as the final or production mold. From the master female mold, a number of small male sections are cast and pieced together to form a large production mold which may conveniently be a continuous belt type. There is also provided a means for forming openings in the production mold through which vacuum may be drawn.

It is an object of this invention to provide a convenient and efficient method of making a large production mold having an intricate pattern.

It is another object of this invention to provide a method of using a flexible mold rather than expensive metal molds which are difficult and expensive to make, for making the production mold.

It is a further object of this invention to provide a method which allows fabrication of a production mold of any convenient size and shape.

It is still another object of this invention to provide a method of incorporating holes for vacuum draw into the female mold rather than having to drill or punch them, as is the conventional practice.

In the drawings which illustrate a specific embodiment of the invention:

FIG. 1 is a plan view of a master male mold according to this invention;

FIG. 2 is a section view taken substantially along line 2—2 of FIG. 1;

FIG. 3 is a plan view of a master female or intermediate mold according to this invention;

FIG. 4 is a section view taken substantially along line 4—4 of FIG. 3;

Figure 5:
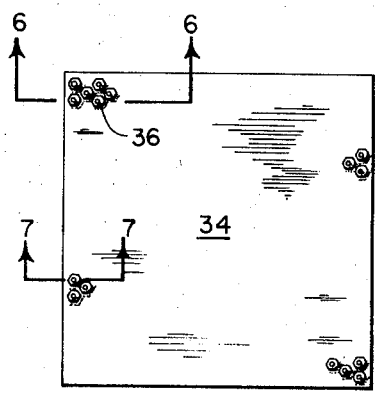
FIG. 5 is a plan view of a section of a production mold made in accordance with this invention.
Figure 6:
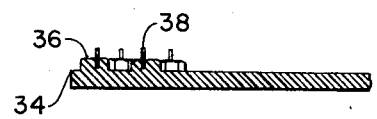
FIG. 6 is a section view taken along line 6—6 of FIG. 5.
Figure 7:
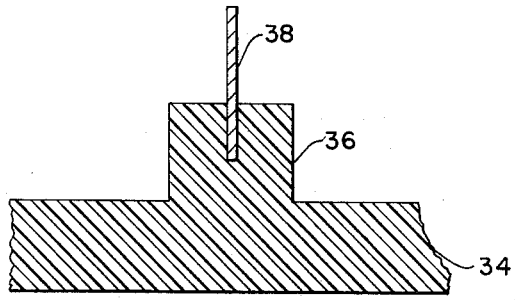
FIG. 7 is an enlarged section view taken substantially along line 7—7 of FIG. 5.

Referring to the drawings, FIGS. 1 and 2 illustrate the master male mold according to the present invention from which the master female mold illustrated in FIGS. 3 and 4 is fabricated. The master male mold illustrated in FIGS. 1 and 2 may conveniently be constructed from a metal base plate 10. The casting area of the base plate 10 is defined by end plates 12, 14, 16, and 18, secured thereto by several studs 20. The base plate 10 is provided with a plurality of core elements 22, which may be integral with the base plate or secured thereto by convenient means such as screws 24. Preferably, the core elements 22 are of a molded plastic material and removably attached to the base plate 10. The core elements 22 may be of a material such as metal or plastic, and are arranged in a desired pattern such as illustrated in FIG. 1 which includes a plurality of equally spaced rows, each containing a plurality of equally spaced core elements and alternate rows being staggered such that a continuous pattern is provided. The core elements 22 must be of a material which will withstand temperatures in the order of 175°F., as well as rapid temperature changes. From the master male mold, illustrated in FIGS. 1 and 2, the master female or intermediate mold generally designated 30 is made by casting material onto the casting surface of the master male mold 10. The core elements 22 serve to provide depressed areas 32 in the master female mold. The master female mold is made of a durable, flexible material such as rubber. From the master female mold, the final or production male mold illustrated in FIGS. 5, 6, and 7 is fabricated. The production mold is similar in appearance to the master male mold illustrated in FIGS. 1 and 2 and is substantially a duplicate thereof except it is made from a material which may be the same as the master female mold, that is, rubber. The male production mold includes a plurality of integral core elements 36 projecting from the upper surface thereof for making a perforated belt section through which a vacuum may be drawn on this production mold. Holes are drilled in each of the projecting core elements 36 and a spike 38 is secured therein. The spike 38 may conveniently be of metal and adhesively secured in the hole which has been drilled in the projection 36.

Figure 8:
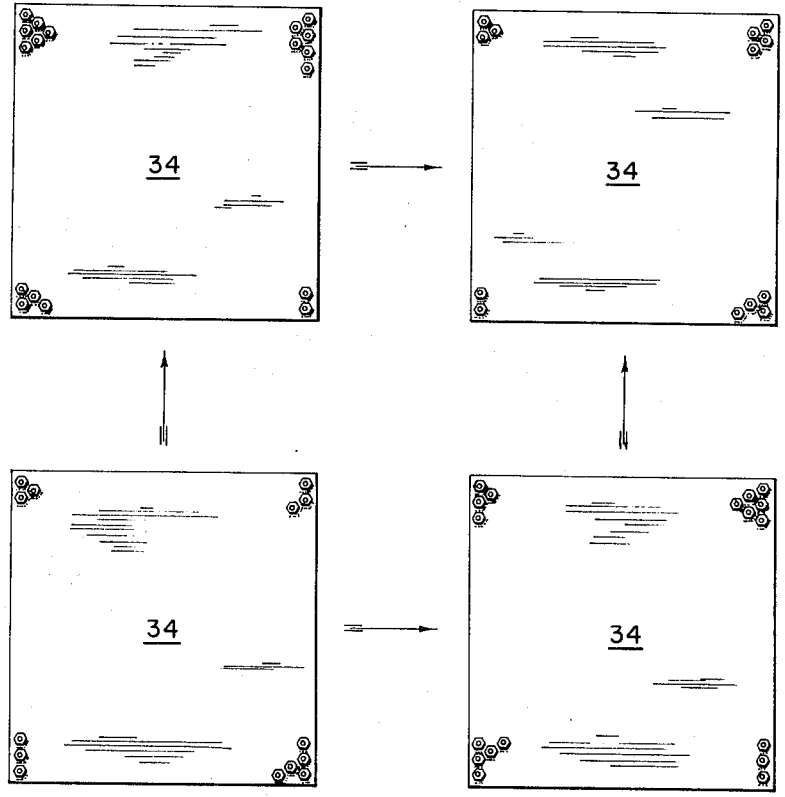
FIG. 8 is a schematic view showing the manner in which sections of the production mold is pieced together.

FIG. 8 illustrates a manner in which several of the male production molds 34 may be joined to form a larger mold which may be an endless, belt-type mold. Many of these sections 34 may be placed together in this manner and their abutted edges connected by means of adhesive, stitching, or the like. Each of the sections 34 are placed such that their edges joining the adjacent sections form substantially a continuous pattern of the details of the mold. Thus, the parallel, equally-spaced rows containing the equally spaced projecting core elements are in the form of a continuous pattern.

Such a combination of sections 34 may be used to produce a larger section from which sections of the material to be cast can be made and put in the form of a continuous belt. This combined section of molds 34 may be of an elastomeric material such as silicone rubber. The product to cast on this enlarged mold may be of the same material as the mold itself. The following is an example of molds made in accordance with this invention.

EXAMPLE

SILASTIC E RTV Mold-Making Rubber, a product of Dow-Corning Corporation, is cast to make a female hexagon structured mold as follows:

1. Six pounds of rubber are mixed with 0.6 pounds (10 percent) thinner and blended thoroughly with a spatula, taking care not to whip air into the blend.

2. A solution of 5 to 15 percent petroleum jelly in methylene chloride is poured over the master male mold, insuring all plugs have been wet by the solution. The mold is then drained thoroughly, leaving a thin film of petroleum jelly on all mold surfaces. The excess methylene chloride is allowed to evaporate (within one-half hour at room temperature, or it may be flashed off in an oven at 130°–160°F. in 3 to 5 minutes).

3. The male mold is then set in a large oven/vacuum chamber and leveled to insure even flow of the silicone rubber when poured in.

4. The rubber thinned with 10 percent inert thinner "SILASTIC RTV THINNER," a product of Dow-Corning Corporation, is then catalyzed with 0.6 pounds of SILASTIC E RTV Catalyst, a product of Dow-Corning Corporation in the same manner the thinner was mixed. This solution will remain pourable for up to two hours before extensive curing takes place.

5. The thinned, catalyzed rubber is placed in a vacuum desicator and 28 inch – 30 inch Hg vacuum is drawn to de-air the solution. Immediately, the rubber expands to 4 to 5 times its original volume as the initial air is drawn off, then the level of the solutions falls to its original height. This process takes 4 to 6 minutes. The rubber is then sufficiently deaerated to be poured.

6. The rubber is poured into the male mold in the oven (not turned on at this point), taking care to completely cover all hexagons to a level even with the side edges.

7. The top is placed on the oven/vacuum chamber, and the rubber in the mold is deaerated again with 27 inch – 29 inch vacuum. The vacuum is pulled for 10 to 15 minutes until bubbles appear all over the rubber surface. The oven is then heated, collapsing the bubbles and inducing flow into the voids where the air comes out of solution. Vacuum is pulled again for 15 minutes and then the chamber is vented.

8. Heaters in the oven/vacuum chamber are now turned on, with a thermostat set at 160°F. The air pressure is atmospheric. The rubber will cure completely in two hours. The heaters are turned off, the oven plate (top) is raised, and the mold is allowed to cool.

9. When the mold has cooled sufficiently that it may be picked up, it is then taken to a freezer at 0°F. and left for 1 to 2 hours to reach the thermal equilibrium. It is then removed and the silicone rubber production mold is pulled gently from the male mold. Adhesive will repair any tears which may occur.

The invention has been described in considerable detail with particular reference to certain preferred embodiments thereof, but it will be understood that variations and modifications can be effected within the spirit and scope of the invention.

We claim:

1. The method of fabricating a mold of flexible material for casting a product having a pattern of depressions, substantially all of which have an opening at the bottom of said depressions for the transmission of vacuum therethrough, which comprises the steps of
    a. forming a relatively small master mold of a rigid material having a configuration similar to that of the desired production mold,
    b. casting an intermediate mold in said master mold of a soft, flexible material to thereby form it in a configuration opposite to that of said master mold,
    c. casting a section of a production mold of a flexible material from said intermediate mold to form a mold of the same general configuration as said master mold,
    d. inserting a plurality of pins in said production mold in a manner such that they extend beyond the surface of said production mold, by an amount at least as great as the thickness of the product to be cast thereon, and
    e. placing a plurality of said production molds in adjacent relationship in a manner such that the pattern established thereby is substantially continuous, and connecting said production molds.

2. The method according to claim 1 in which said intermediate mold is cast of the same material as said production mold.

3. The method according to claim 2 in which the material used to cast said intermediate mold and said production mold is silicone rubber.

4. The method according to claim 1 which includes forming said master mold of a generally flat plate and a plurality of core elements removably attached thereto.

* * * * *